(12) United States Patent
Liu (10) Patent No.: US 12,225,608 B2
(45) Date of Patent: Feb. 11, 2025

(54) METHOD FOR MODIFICATION IN DUAL-CONNECTION MODE AND DEVICE

(71) Applicant: DATANG MOBILE COMMUNICATIONS EQUIPMENT CO., LTD., Beijing (CN)

(72) Inventor: Aijuan Liu, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 540 days.

(21) Appl. No.: 17/608,742

(22) PCT Filed: Mar. 31, 2020

(86) PCT No.: PCT/CN2020/082561
§ 371 (c)(1),
(2) Date: Nov. 3, 2021

(87) PCT Pub. No.: WO2020/228435
PCT Pub. Date: Nov. 19, 2020

(65) Prior Publication Data
US 2022/0322166 A1   Oct. 6, 2022

(30) Foreign Application Priority Data

May 10, 2019 (CN) .......................... 201910388462.8

(51) Int. Cl.
*H04W 76/15* (2018.01)
*H04W 36/00* (2009.01)

(52) U.S. Cl.
CPC ....... *H04W 76/15* (2018.02); *H04W 36/0027* (2013.01); *H04W 36/0038* (2013.01); *H04W 36/0069* (2018.08)

(58) Field of Classification Search
None
See application file for complete search history.

(56) References Cited

U.S. PATENT DOCUMENTS

| 2016/0135174 A1 | 5/2016 | Lee et al. |
| 2020/0053815 A1* | 2/2020 | Teyeb ................. H04W 76/11 |
| 2023/0262514 A1* | 8/2023 | Van Der Velde ..... H04W 76/22 370/235 |

FOREIGN PATENT DOCUMENTS

| CN | 101883443 A | 11/2010 |
| CN | 102387534 A | 3/2012 |

(Continued)

OTHER PUBLICATIONS

Ericsson, "PDU Session Split at UPF", 3GPP TSG-RAN WG3 Meeting #96, Hangzou, P.R. China, May 15-19, 2017, total 2 pages, R3-171711.

(Continued)

*Primary Examiner* — Christine T Duong
(74) *Attorney, Agent, or Firm* — Kilpatrick Townsend & Stockton LLP (57) ABSTRACT

Disclosed are a method for modification in dual-connection mode and a device. The method for modification in dual-connection mode provided includes: an MN determines an SN to which at least one flow is to be transferred, the MN sending to the SN a transfer instruction carrying the indication information of the PDU session to which the at least one flow belongs, the transfer instruction is used for the SN to determine whether to receive the flow transferred by the MN, the indication information of the PDU session is used for indicating that the at least one flow includes part or all of the flow under a PDU session.

18 Claims, 6 Drawing Sheets

(56) References Cited

FOREIGN PATENT DOCUMENTS

| | | |
|---|---|---|
| CN | 104918329 A | 9/2015 |
| CN | 104936175 A | 9/2015 |
| CN | 106941733 A | 7/2017 |
| CN | 108282817 A | 7/2018 |
| CN | 108377567 A | 8/2018 |
| CN | 108810954 A | 11/2018 |
| CN | 109246833 A | 1/2019 |
| KR | 20190049782 A | 5/2019 |
| WO | 2017118225 A1 | 7/2017 |

OTHER PUBLICATIONS

Huawei,"Email discussion summary on [101#35][LTE/5GC] Flow based QoS", 3GPP TSG-RAN WG2 Meeting #101b Sanya, China, Apr. 16-20, 2018, total 15 pages, R2-1805467.

Huawei,"(TP for BL CR for TS 37.340): In-order delivery in MR-DC QoS flow offloading", 3GPP TSG-RAN3 Meeting #101-bis, Chengdu, China, Oct. 8-12, 2018, total 7 pages, R3-185775.

Huawei,"Further considerations on security protection for MR-DC", 3GPP TSG-RAN3 Meeting #103bis, Xi'an, China, Apr. 8-12, 2019, total 3 pages, R3-191595.

* cited by examiner

METHOD FOR MODIFICATION IN DUAL-CONNECTION MODE AND DEVICE

CROSS REFERENCE TO RELATED APPLICATIONS

The present application is a National Stage of International Application No. PCT/CN2020/082561, filed on Mar. 31, 2020, which claims priority to Chinese patent application No. 201910388462.8 filed on May 10, 2019 to the China National Intellectual Property Administration, and entitled "METHOD AND DEVICE FOR MODIFICATION IN DUAL-CONNECTION MODE", the entire content of which are incorporated herein by reference.

FIELD

The present application relates to the field of wireless communication, in particular to a method and device for modification in a dual-connection mode.

BACKGROUND

Under a dual-connection scenario in a communication process, a master node (MN) transferring part or all of flows under a protocol data unit (PDU) session to a secondary node (SN) is always involved, and standards for flow transfer between the MN and the SN are different according to different security indications of the PDU session. According to provisions of a current communication standard, when the security indication may be preferable, one case is that if part of flows under a PDU session is transferred to the SN, the SN must be configured with the same security result as the MN. If the SN cannot adopt the same encryption and completeness protection operation as the MN, the PDU session is refused to be accepted. Another case is that if the MN transfers all of flows under a PDU session to the SN, the SN can adopt the same encryption and completeness protection operation as the MN or can adopt the different encryption and completeness protection operation as the MN, that is, when the SN and the MN are configured with different security results, the PDU session can still be accepted.

In the related art, in the process that the MN transfers part or all of flows under a PDU session to the SN, no matter the MN transfers part of the flows or all of the flows under the PDU session to the SN, as long as the SN and the MN are configured with the different security results, the SN refuses to accept the PDU session, which easily reduces the communication performance of a terminal in the communication process.

In conclusion, the communication performance of the terminal is easily reduced after setup or modification in a current dual-connection architecture.

SUMMARY

Embodiments of the present application provide a method and device for modification in a dual-connection mode, for use in solving the problem that the communication performance of a terminal is easily reduced after setup or modification in a current dual-connection architecture.

Embodiments of the present application provides a method for modification in a dual-connection mode, including:

determining, by an MN, an SN to which at least one flow is to be transferred; and sending, by the MN, to the SN a transfer instruction carrying indication information of a PDU session to which the at least one flow belongs;

so that the SN determines, according to the transfer instruction, whether to receive the at least one flow transferred by the MN;

the indication information of the PDU session includes information for indicating that the at least one flow includes part or all of flows under the PDU session.

In a possible implementation, the determining, by the MN, an SN to which at least one flow is to be transferred, includes: determining, by the MN, an SN needing to be added as the SN; or determining, by the MN, an SN needing to be modified as the SN.

In a possible implementation, the sending, by the MN, to the SN the transfer instruction carrying the indication information of the PDU session, includes: carrying, by the MN, the transfer instruction containing the indication information of the PDU session in a node adding request sent to the SN needing to be added; or carrying, by the MN, the transfer instruction containing the indication information of the PDU session in a node modifying request sent to the SN needing to be modified.

In a possible implementation, before sending, by the MN, to the SN the transfer instruction carrying flow information, the method further includes: placing, by the MN, the indication information of the PDU session in a PDU session to be set up list in the transfer instruction.

Another embodiment of the present application provides a method for modification in a dual-connection mode, including:

receiving, by an SN, a transfer instruction carrying indication information of a PDU session to which at least one flow belongs sent by an MN; and determining, by the SN, whether to receive the at least one flow transferred by the MN according to the transfer instruction.

In a possible implementation, the determining, by the SN, whether to receive the at least one flow transferred by the MN according to the transfer instruction, includes: determining, by the SN, to receive the at least one flow transferred by the MN if the SN determines that the at least one flow includes all of the flows under the PDU session according to the transfer instruction; or determining, by the SN, whether to receive the at least one flow transferred by the MN according to configuration of the SN and configuration of the MN notified in the transfer instruction if the SN determines that the at least one flow includes part of the flows under the PDU session according to the transfer instruction.

In a possible implementation, after determining, by the SN, to receive the at least one flow transferred by the MN if the SN determines that the at least one flow includes all of the flows under the PDU session according to the transfer instruction, the method further includes: notifying, by the SN, a terminal to change configuration of the PDU session to be not-performed if the SN determines that the configuration of the SN is different from the configuration of the MN notified in the transfer instruction.

In a possible implementation, the determining, by the SN, whether to receive the at least one flow transferred by the MN according to the configuration of the SN and the configuration of the MN notified in the transfer instruction, includes: determining not to receive the at least one flow transferred by the MN if the SN determines that the configuration of the SN is different from the configuration of the MN notified in the transfer instruction; or determining to receive the at least one flow transferred by the MN if the SN determines that the configuration of the SN is same as the configuration of the MN notified in the transfer instruction.

In a possible implementation, the configuration is configured to represent security indication information and security result information of the PDU session.

One embodiment of the present application provides a device for modification in a dual-connection mode, including: a processor, a memory and a transceiver:

the processor is configured to determine an SN to which at least one flow is to be transferred; and sent to the SN a transfer instruction carrying indication information of a PDU session to which the at least one flow belongs;

so that the SN determines, according to the transfer instruction, whether to receive the at least one flow transferred by an MN;

the indication information of the PDU session includes information for indicating that the at least one flow includes part or all of flows under the PDU session.

In some embodiment of the present application provides a device for modification in a dual-connection mode, including: a processor, a memory and a transceiver:

the processor is configured to receive a transfer instruction carrying indication information of a PDU session to which at least one flow belongs sent by an MN; and determine whether to receive the at least one flow transferred by the MN according to the transfer instruction.

In other embodiments of the present application provides a device for modification in a dual-connection mode, including:

at least one processing unit and at least one storage unit, and the storage unit stores a program code, and the program code, when executed by the processing unit, makes the processing unit to execute functions of embodiments of any embodiments in the other embodiments.

In one embodiment, the determining device is further configured to:

determine an SN needing to be added as an SN; or
determine an SN needing to be modified as the SN.

In one embodiment, the processing unit is further configured to:

carry a transfer instruction containing indication information of a PDU session in a node adding request sent to the SN needing to be added; or carry the transfer instruction containing the indication information of the PDU session in a node modifying request sent to the SN needing to be modified.

In one embodiment, the processing unit is further configured to:

place the indication information of the PDU session in a PDU session to be set up list in the transfer instruction.

One embodiment of the present application provides a device for modification in a dual-connection mode, including:

at least one processing unit and at least one storage unit, and the storage unit stores a program code, and the program code, when executed by the processing unit, makes the processing unit to execute functions of embodiments of any embodiment in the other embodiments.

In one embodiment, the processing unit is further configured to:

determine to receive at least one flow transferred by an MN if it is determined that the at least one flow includes all of flows under a PDU session according to a transfer instruction; or determine whether to receive the at least one flow transferred by the MN according to configuration of an SN and configuration of the MN notified in the transfer instruction if it is determined that the at least one flow includes part of flows under a PDU session according to the transfer instruction.

In one embodiment, the processing unit is further configured to:

notify a terminal to change configuration of the PDU session to be not-performed if it is determined that the configuration of the SN is different from the configuration of the MN notified in the transfer instruction.

In one embodiment, the processing unit is specifically configured to:

determine not to receive the at least one flow transferred by the MN if it is determined that the configuration of the SN is different from the configuration of the MN notified in the transfer instruction; or determine to receive the at least one flow transferred by the MN if it is determined that the configuration of the SN is the same as the configuration of the MN notified in the transfer instruction.

In one embodiment, the configuration is configured to represent security indication information and security result information of the PDU session.

Yet another embodiment of the present application further provides a computer storage medium, storing a computer program thereon, and the program, when executed by a processor, implements steps of any method in the other embodiments.

An embodiment of the present application further provides a computer storage medium, storing a computer program thereon, and the program, when executed by a processor, implements steps of any method in the other embodiments.

BRIEF DESCRIPTION OF THE DRAWINGS

In order to explain solutions in embodiments of the present application more clearly, the drawings that need to be used in the description of the embodiments will briefly introduce as follows. Apparently, the drawings in the following description are only some embodiments of the embodiments of the present application, on the premise of no creative labor, other drawings can be obtained from these drawings.

DETAILED DESCRIPTION OF THE EMBODIMENTS

In order to make the objects, solutions and advantages of embodiments of the present application clearer, the embodiments of the present application will be further described in detail in combination with the attached drawings below. Apparently, the described embodiments are only part of the embodiments of the present application, not all of them.

Some terms appearing in the text are explained below.

(1) The term "a plurality of" in the embodiments of the present application means two or more, and other quantifiers are similar to it.

(2) "And/or" describes the association relationship of associated objects, which means that there can be three kinds of relationships, for example, A and/or B can mean that there are three kinds of situations: A alone, A and B at the same time, and B alone. The character "/" generally indicates that associated objects in front of and behind it are in an "or" relationship.

(3) In the embodiments of the present application, a "dual-connection architecture" refers to that a system has one MN and one to many SNs, and the MN and the SNs are both base station nodes supporting LET/e-LTE/NR.

(4) In the embodiments of the present application, an "evolved node B (e-NodeB)" integrates part of functions of an RNC, reduces the level of protocols during communication and is in charge of all functions related to an air interface.

(5) In the embodiments of the present application, an "X2 interface" is an interface between the e-NodeBs and supports direct transmission of data and signaling, the X2 is divided into two interfaces, one is an X2-C interface for a control plane, and the other is an X2-U interface for a user plane.

(6) In the embodiments of the present application, "radio resource control (RRC)" is configured to process the third layer of information of a control plane between a terminal and an eNodeB.

Figure 1:
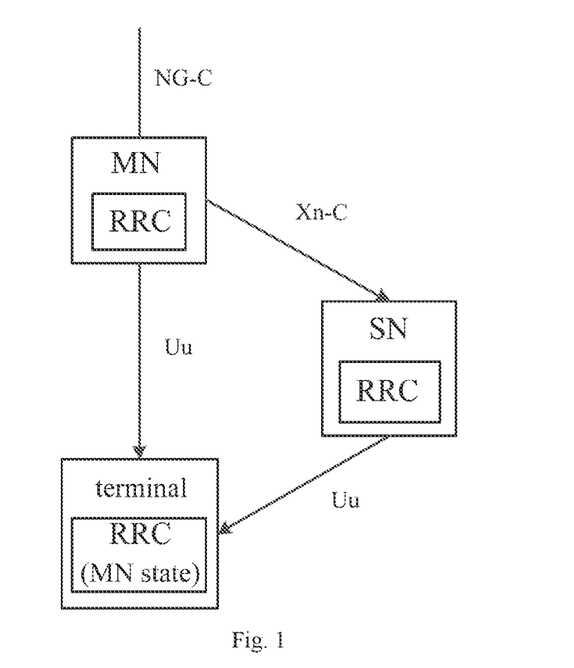
FIG. 1 is a schematic diagram of a dual-connection architecture in an embodiment of the present application.

At present, in order to support higher data throughout, the dual-connection architecture is generally adopted in a long term evolution (LTE) system and a 5G system. The embodiments of the present application are introduced with the 5G system, for example, as shown in FIG. 1, UE is connected to an MN and an SN at the same time at an air interface, and the MN and the SN are connected through an Xn-C interface or an X2-C interface.

In the 5G system, a core network manages user planes based on the granularity of a PDU session, one PDU session may have a plurality of flows which bear different businesses, and encryption and completeness protection of the user planes are introduced when the MN transfers part or all of the flows under the PDU session to the SN. Therefore, when the MN transfers part of the flows under the PDU session to the SN and when security indication may be preferable, the SN and the MN need to use the same security result, otherwise, the SN refuses to accept the flows transferred by the MN; alternatively, when the MN transfers all of the flows under the PDU session to the SN and when the security indication may be preferable, the SN may adopt an encryption and completeness protection operation which is the same as or different from the MN, and the SN may also accept the flows transferred by the MN under the scenario of failure to adopt the encryption and completeness protection operation which is the same as the MN.

While in the related art, when an MN transfers part or all of flows under a PDU session to an SN, the SN cannot determine whether the MN transfers part or all of the flows under the PDU session from an SN side. The SN can only determine whether to use the same security result as the MN according to a transfer instruction sent by the MN, so that when the SN determines to use the security result different from the MN, the SN refuses to accept the flows transferred by the MN no matter the MN transfers part or all of the flows under the PDU session. Therefore, the case that the SN accepts the flows transferred by the MN when the MN transfers all of the flows under the PDU session cannot be implemented in the related art, which easily reduces the communication performance of a terminal in a communication process.

Figure 2:
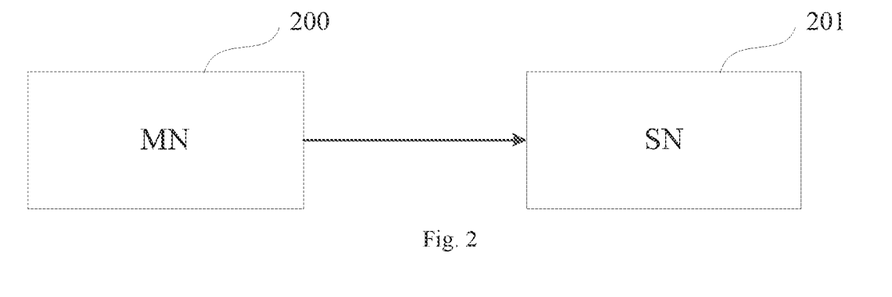
FIG. 2 is a schematic diagram of a system for modification in a dual-connection mode in an embodiment of the present application.

In view of this, as shown in FIG. 2, the embodiments of the present application provide a system for modification in a dual-connection mode, and the system includes:

an MN 200 configured to determine an SN to which at least one flow is to be transferred; and send to the SN a transfer instruction carrying indication information of a PDU session to which the at least one flow belongs, and the transfer instruction is used for the SN to determine whether to receive the at least one flow transferred by the MN, so that the SN determines, according to the transfer instruction, whether to receive the at least one flow transferred by the MN, and the indication information of the PDU session includes information for indicating that the at least one flow includes part or all of flows under a PDU session; and an SN 201 configured to receive the transfer instruction carrying the indication information of the PDU session to which at least one flow belongs sent by the MN; and determine, according to the transfer instruction, whether to receive the at least one flow transferred by the MN.

In the above method, when the MN sends the transfer instruction to the SN to which at least one flow is to be transferred, the indication information configured to indicate whether the at least one flow transferred by the MN includes part or all of the flows under the PDU session is carried in the transfer instruction, so that after receiving the transfer instruction, the SN may determine whether the MN transfers part or all of the flows under the PDU session from the indication information of the PDU session in the transfer instruction to determine whether to receive the at least one flow transferred by the MN according to the transfer instruction, and when the MN transfers all of the flows under the PDU session, the SN may also successfully accept the flows transferred by the MN, and effectively improving communication performance of a terminal in a communication process.

Further, the transfer instruction further contains security indication configured for the MN, so that after receiving the transfer instruction sent by the MN, the SN compares the security indication information configured for the MN contained in the transfer instruction with security indication configured for the SN.

Further, in the embodiments of the present application, there may be a plurality of methods to make the indication information of the PDU session contain the information for indicating that the at least one flow transferred by the MN includes part or all of the flows under the PDU session, for example, as shown in Table 1, the MN places the indication information of the PDU session in a PDU session to be set up list in the transfer instruction. That is, a new split indicator IE is added into >>PDU Session resource set up info—SN terminated IE in the PDU session to be set up list, and when the IE is set as SPLIT, it represents that the MN sends part of the flows under the PDU session to the SN, and when the IE is set as non-SPLIT, it represents that the MN sends all of the flows under the PDU session to the SN.

Figure 3:
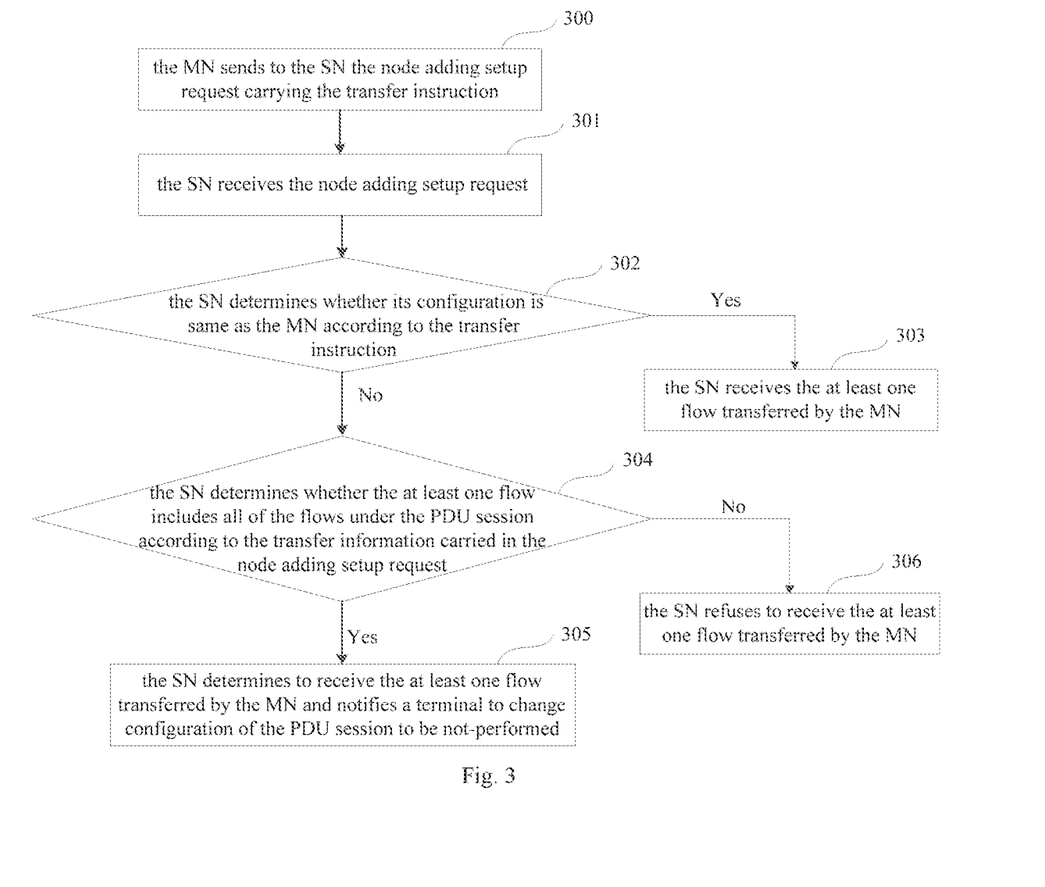
FIG. 3 is a schematic diagram of a first flow that an MN transfers a flow to an SN in an embodiment of the present application.

Step 300: the MN sends to the SN the node adding setup request carrying the transfer instruction.

The transfer instruction includes the indication information of the PDU session to which the transferred flow belongs, and the indication information of the PDU session includes information for indicating the at least one flow transferred by the MN transfers includes part or all of the flows under the PDU session.

TABLE 1

Newly-added PDU session indication information schematic table.

| Group name | Business | Range | IE type and citation | Semantic description | Critical | Allocation critical |
|---|---|---|---|---|---|---|
| QoS flow list to be set up | | 1 | | | — | |
| >QoS flow to be set up | | 1 ... <largest noof QoS flow> | | | — | |
| >>flow identification | M | | 9.2.3.10 | | — | |
| >>flow-level QoS parameter | M | | 9.2.3.5 | For a GBR QoS flow, the IE contains GBR QoS flow information received by NG-C | — | |
| >>provided bit rate guaranteeing QoS flow information | O | | GBR QoS flow information 9.2.3.6 | The IE contains GBR QoS flow information provided by a node m | — | |
| Forwarding and unloading data information from a source NG-RAN node | O | | 9.2.1.17 | | — | |
| Security indication | O | | 9.2.3.52 | | — | |
| Security result | O | | 9.2.3.67 | | YES | Reject |
| Separation indication | O | | Enumeration (split, non-split, ...) | To indicate whether a PDU session is split | | |

Further, there are many methods for the MN to determine the SN for flow transfer in the embodiments of the present application, which are specifically not limited to the following.

Determining method 1: the MN determines an SN needing to be added as the SN to which at least one flow is to be transferred.

Further, when the MN determines the SN needing to be added as the SN to which at least one flow is to be transferred, the transfer instruction may be carried in a node adding setup request sent to the SN.

Accordingly, when the MN transfers flows under a PDU session to the newly added SN, if the security indication notified in the transfer instruction may be preferable, the SN further needs to continue judging whether the at least one flow transferred by the MN may be received. When the security indication notified in the transfer instruction may be preferable, a flow that the MN transfers flows to the SN may be as shown in FIG. 3.

Step 301: the SN receives the node adding setup request.

Step 302: the SN determines whether its configuration is same as the MN according to the transfer instruction, if yes, step 303 is executed, and if not, step 304 is executed.

Step 303: the SN receives the at least one flow transferred by the MN.

Step 304: the SN determines whether the at least one flow includes all of the flows under the PDU session according to the transfer information carried in the node adding setup request, if yes, step 305 is executed, and if not, step 306 is executed.

Step 305: the SN determines to receive the at least one flow transferred by the MN and notifies a terminal to change configuration of the PDU session to be not-performed.

Step 306: the SN refuses to receive the at least one flow transferred by the MN.

It needs to be noted that the order of the steps of the flow that the MN transfers the at least one flow to the newly added SN as shown in FIG. 3 of the present application is not limited, and any flow applicable to the present application belongs to the protection scope of the present application. For example, in the embodiments of the present application, the SN may determine whether the MN transfers all of the flows under the PDU session first according to the transfer information and then determine whether its configuration is the same as the MN according to the transfer information.

Determining method 2: the MN determines an SN needing to be modified as the SN to which at least one flow is to be transferred.

Figure 4:
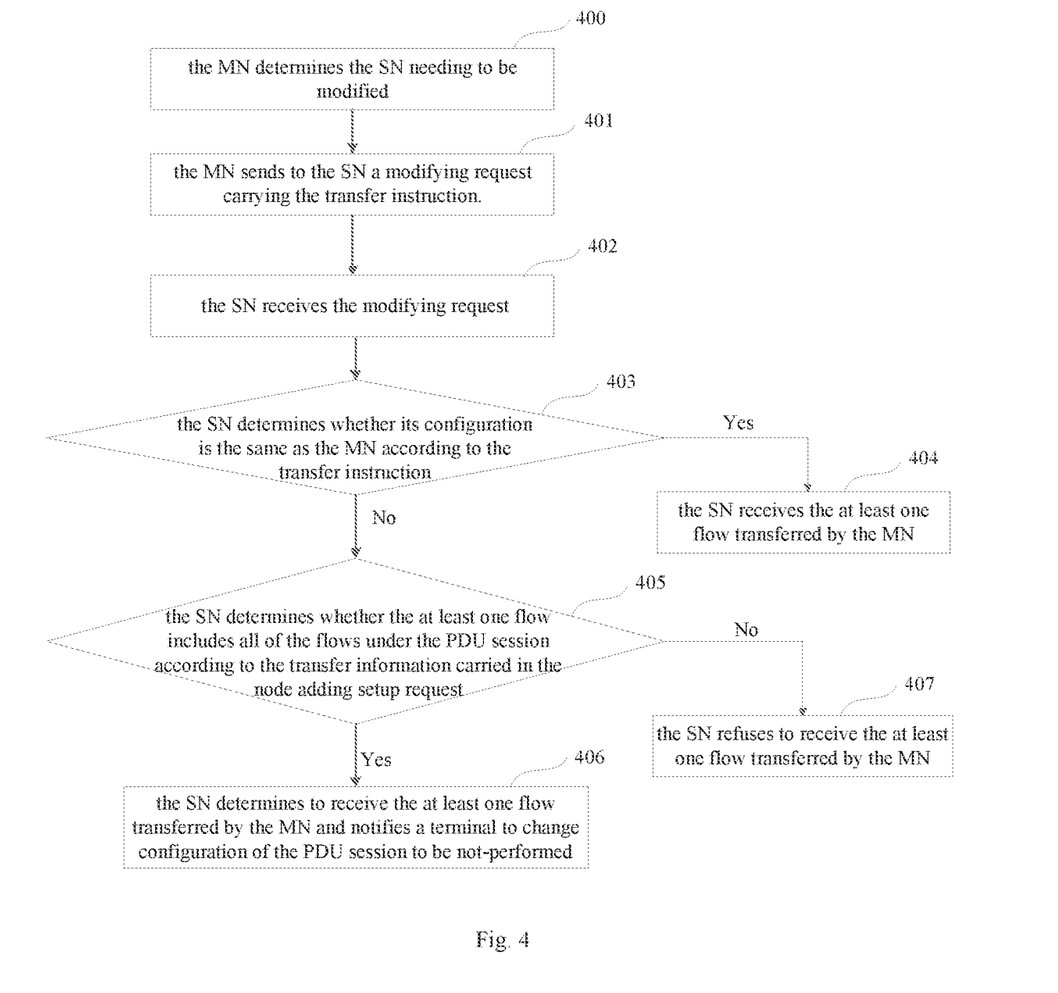
FIG. 4 is a schematic diagram of a second flow that an MN transfers a flow to an SN in an embodiment of the present application.

Accordingly, when the MN transfers the at least one flow under the PDU session to the SN needing to be modified, if the security indication notified in the transfer instruction may be preferable, the SN further needs to continue judging whether the at least one flow transferred by the MN may be received. When the security indication notified in the transfer instruction may be preferable, a flow that the MN transfers at least one flow to the SN may be as shown in FIG. 4.

Step 400: the MN determines the SN needing to be modified.

Step 401: the MN sends to the SN a modifying request carrying the transfer instruction.

The transfer instruction contains the indication information of the PDU session to which the transferred at least one flow belongs, and the indication information of the PDU session contains the information for indicating whether the at least one flow transferred by the MN transfers includes part or all of the at least one flow under the PDU session.

Step 402: the SN receives the modifying request.

Step 403: the SN determines whether its configuration is the same as the MN according to the transfer instruction, if yes, step 404 is executed, and if not, step 405 is executed.

Step 404: the SN receives the at least one flow transferred by the MN

Step 405: the SN determines whether the at least one flow includes all of the flows under the PDU session according to the transfer information carried in the node adding setup request, if yes, step 406 is executed, and if not, step 407 is executed.

Step 406: the SN determines to receive the at least one flow transferred by the MN and notifies a terminal to change configuration of the PDU session to be not-performed.

Step 407: the SN refuses to receive the at least one flow transferred by the MN.

It needs to be noted that the order of the steps of the flow that the MN transfers the at least one flow to the determined SN needing to be modified as shown in FIG. 4 of the present application is not limited, and any flow applicable to the present application belongs to the protection scope of the present application. For example, in the embodiments of the present application, the SN may determine whether the at least one flow transferred by the MN transfers include all of the flows under the PDU session first according to the transfer information and then determine whether its configuration is the same as the MN according to the transfer information.

Figure 5:
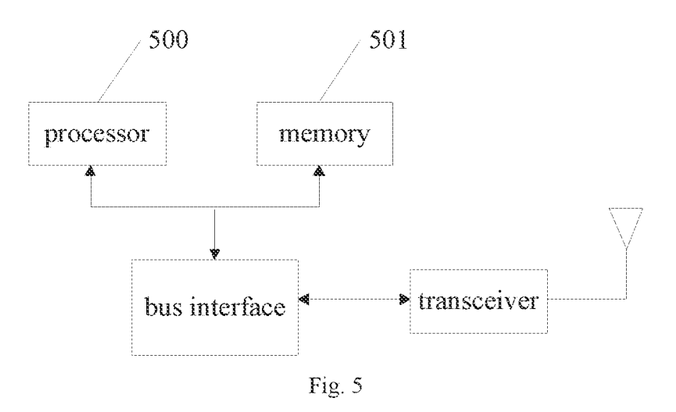
FIG. 5 is a schematic structural diagram of a first MN device for modification in a dual-connection mode in an embodiment of the present application.

As shown in FIG. 5, the embodiments of the present application provide an MN device for modification in a dual-connection mode. The device includes a processor 500, a memory 501 and a transceiver 502.

The processor 500 is responsible for managing a bus architecture and general processing, and the memory 501 may store data used when the processor 500 executes operations. The transceiver 502 is configured to receive and send data under the control of the processor 500.

The bus architecture may include interconnected any quantity of buses and any quantity of bridges, which are specifically linked together through various circuits of one or more processors represented by the processor 500 and various circuits of memories represented by the memory 501. The bus architecture may also link various other circuits such as peripheral devices, voltage regulators, and power management circuits, which are well known in the art, and therefore are not further described herein. A bus interface provides an interface. The processor 500 is responsible for managing the bus architecture and general processing, and the memory 501 may store data used when the processor 500 executes operations.

A flow disclosed in the embodiments of the present application may be applied to the processor 500 or implemented by the processor 500. During an implementation process, all steps of a signal processing flow may be completed by an integrated logic circuit of hardware or an instruction in the form of software in the processor 500. The processor 500 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 501, and the processor 500 reads information in the memory 501, and completes the steps of the signal processing flow in combination with its hardware.

Specifically, the processor 500 is configured to read a program in the memory 501 and execute:

determining an SN to which at least one flow is to be transferred; and sending to the SN a transfer instruction carrying indication information of a PDU session to which the at least one flow belongs, so that the SN determines, according to the transfer instruction received by the SN, whether to receive the at least one flow transferred by an MN;

the indication information of the PDU session includes information for indicating that the at least one flow includes part or all of flows under the PDU session.

In one embodiment, the processor 500 is specifically configured to:

determine an SN needing to be added as the SN; or determine an SN needing to be modified as the SN.

In one embodiment, the processor 500 is specifically configured to:

carry a transfer instruction containing indication information of a PDU session in a node adding request sent to the SN needing to be added; or carry the transfer instruction containing the indication information of the PDU session in a node modifying request sent to the SN needing to be modified.

In one embodiment, the processor 500 is further configured to:

place the indication information of the PDU session in a PDU session to be set up list in the transfer instruction.

Figure 6:
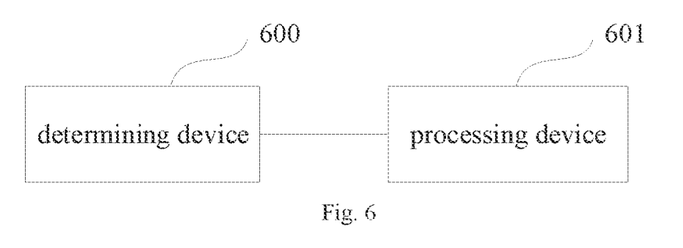
FIG. 6 is a schematic structural diagram of a second MN device for modification in a dual-connection mode in an embodiment of the present application.

As shown in FIG. 6, the present application provides an MN device for modification in a dual-connection mode, and the device includes:

a determining device 600 configured to determine an SN to which at least one flow is to be transferred; and a processing device 601 configured to send to the SN a transfer instruction carrying indication information of a PDU session to which the at least one flow belongs, so that the SN determines, according to the transfer instruction received by the SN, whether to receive the at least one flow transferred by an MN.

The indication information of the PDU session includes information for indicating the at least one flow includes part or all of flows under the PDU session.

In one embodiment, the determining device 600 is further configured to:

determine an SN needing to be added as the SN; or determine an SN needing to be modified as the SN.

In one embodiment, the processing device 601 is further configured to:

carry a transfer instruction containing indication information of a PDU session in a node adding request sent to the SN needing to be added; or carry the transfer instruction containing the indication information of the PDU session in a node modifying request sent to the SN needing to be modified.

In one embodiment, the processing device 601 is further configured to:

place the indication information of the PDU session in a PDU session to be set up list in the transfer instruction.

Based on the same application concept, the embodiments of the present application further provide a method for modification in a dual-connection mode at an MN side. Since the method corresponds to the MN side device for modification in the dual-connection mode introduced in the embodiments of the present application, and a principle for solving problems of the method is similar to that of the MN side device, implementation of this method may be referred to implementation of the MN side device in the embodiment of the present application, and repetition is no longer repeated here.

Figure 7:
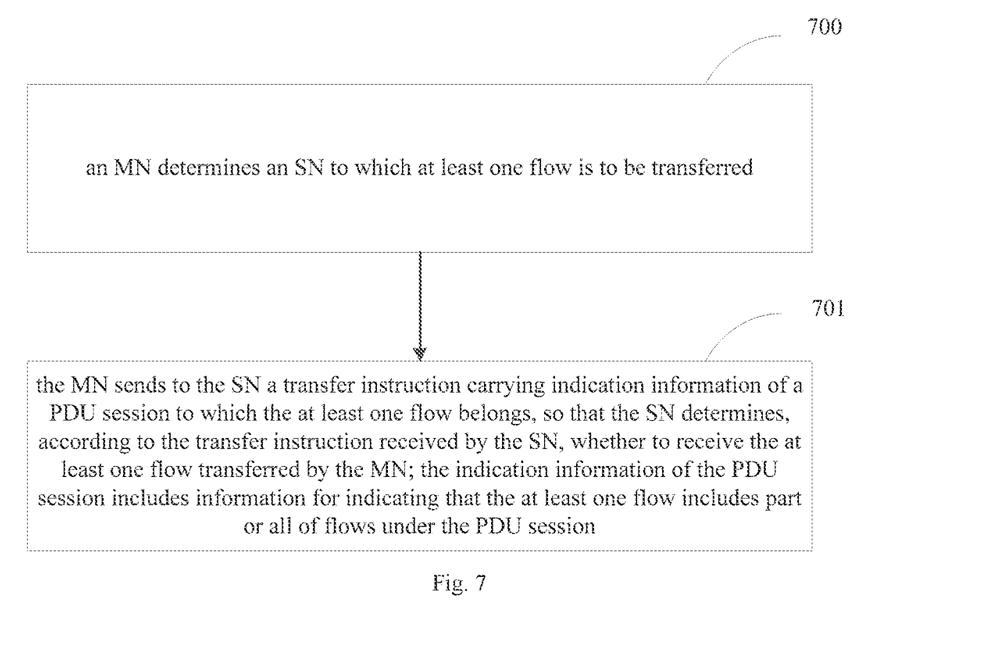
FIG. 7 is a schematic flow diagram of a first method for modification in a dual-connection mode in an embodiment of the present application.

As shown in FIG. 7, the embodiments of the present application further provide a method for modification in a dual-connection mode, and the methods includes:

step 700, an MN determines an SN to which at least one flow is to be transferred; and step 701, the MN sends to the SN a transfer instruction carrying indication information of a PDU session to which the at least one flow belongs, so that the SN determines, according to the transfer instruction received by the SN, whether to receive the at least one flow transferred by the MN; the indication information of the PDU session includes information for indicating that the at least one flow includes part or all of flows under a PDU session.

In one embodiment, the determining, by the MN, the SN to which at least one flow is to be transferred, includes:

the MN determines an SN needing to be added as the SN; or the MN determines an SN needing to be modified as the SN.

In one embodiment, the sending, by the MN, to the SN the transfer instruction carrying the indication information of the PDU session, includes:

the MN carries the transfer instruction containing the indication information of the PDU session in a node adding request sent to the SN needing to be added; or the MN carries the transfer instruction containing the indication information of the PDU session in a node modifying request sent to the SN needing to be modified.

In one embodiment, before to sending, by the MN, to the SN the transfer instruction carrying flow information, the method further includes:

the MN places the indication information of the PDU session in a PDU session to be set up list in the transfer instruction.

Figure 8:
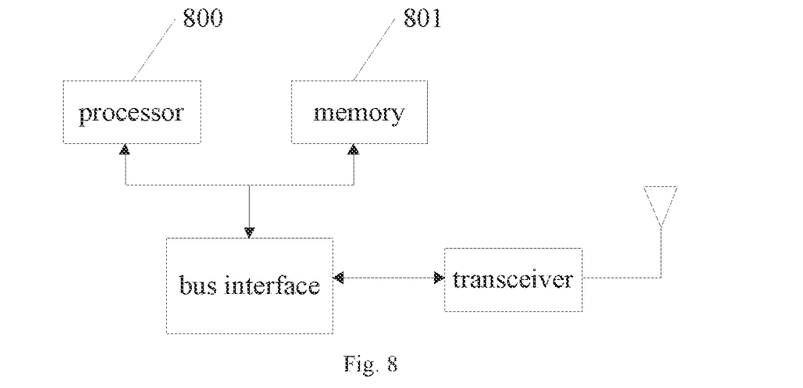
FIG. 8 is a schematic structural diagram of a first SN device for modification in a dual-connection mode in an embodiment of the present application.

As shown in FIG. 8, the embodiments of the present application provide an SN device for modification in a dual-connection mode. The device includes a processor 800, a memory 801 and a transceiver 802.

The processor 800 is responsible for managing a bus architecture and general processing, and the memory 801 may store data used when the processor 800 executes operations. The transceiver 802 is configured to receive and send data under the control of the processor 800.

The bus architecture may include interconnected any quantity of buses and any quantity of bridges, which are specifically linked together through various circuits of one or more processors represented by the processor 800 and various circuits of memories represented by the memory 801. The bus architecture may also link various other circuits such as peripheral devices, voltage regulators, and power management circuits, which are well known in the art, and therefore are not further described herein. A bus interface provides an interface. The processor 800 is responsible for managing the bus architecture and general processing, and the memory 801 may store data used when the processor 800 executes operations.

A process disclosed in the embodiments of the present application may be applied to the processor 800 or implemented by the processor 800. During an implementation process, all steps of a signal processing flow may be completed by an integrated logic circuit of hardware or an instruction in the form of software in the processor 800. The processor 800 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 801, and the processor 800 reads information in the memory 801, and completes the steps of the signal processing flow in combination with its hardware.

Specifically, the processor 800 is configured to read a program in the memory 801 and execute:

receiving a transfer instruction carrying indication information of a PDU session to which a flow belongs sent by an MN; and determining whether to receive the at least one flow transferred by the MN according to the transfer instruction.

In one embodiment, the processor 800 is further configured to:

determine to receive the at least one flow transferred by the MN if it is determined that the at least one flow includes all of flows under a PDU session according to the transfer instruction; or determine whether to receive the at least one flow transferred by the MN according to configuration of an SN and configuration of the MN notified in the transfer instruction if it is determined that the at least one flow includes part of the flows under the PDU session according to the transfer instruction.

In one embodiment, the processor 800 is further configured to:

notify a terminal to change configuration of the PDU session to be not-performed if it is determined that the configuration of the SN is different from the configuration of the MN notified in the transfer instruction.

In one embodiment, the processor 800 is further configured to:

determine not to receive the at least one flow transferred by the MN if it is determined that the configuration of the SN is different from the configuration of the MN notified in the transfer instruction; or determine to receive the at least one flow transferred by the MN if it is determined that the configuration of the SN is same as the configuration of the MN notified in the transfer instruction.

In one embodiment, the configuration is configured to represent security indication information and security result information of the PDU session.

Figure 9:
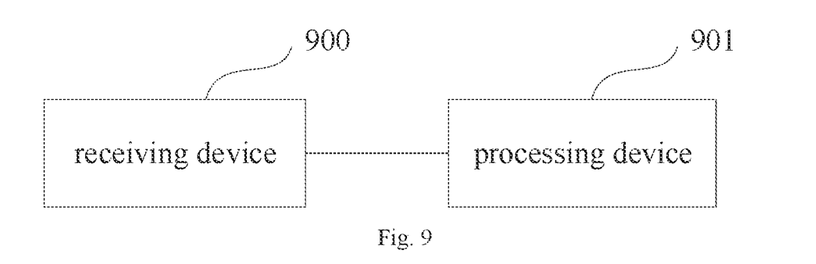
FIG. 9 is a schematic structural diagram of a second SN device for modification in a dual-connection mode in an embodiment of the present application.

As shown in FIG. 9, the present application provides an SN device for modification in a dual-connection mode, and the device includes:

a receiving device 900 configured to receive a transfer instruction carrying indication information of a PDU session to which at least one flow belongs sent by an MN; and a processing device 901 configured to determine whether to receive the at least one flow transferred by the MN according to the transfer instruction.

In one embodiment, the processing device 901 is configured to:

determine to receive the at least one flow transferred by the MN if it is determined that the at least one flow includes all of flows under a PDU session according to the transfer instruction; or determine whether to receive the at least one flow transferred by the MN according to configuration of an SN and configuration of the MN notified in the transfer instruction if it is determined that the at least one flow includes part of the flows under the PDU session according to the transfer instruction.

In one embodiment, the processing device 901 is further configured to:

notify a terminal to change configuration of the PDU session to be not-performed if it is determined that the configuration of the SN is different from the configuration of the MN notified in the transfer instruction.

In one embodiment, the processing device 901 is configured to:

determine not to receive the at least one flow transferred by the MN if it is determined that the configuration of the SN is different from the configuration of the MN notified in the transfer instruction; or determine to receive the at least one flow transferred by the MN if it is determined that the configuration of the SN is the same as the configuration of the MN notified in the transfer instruction.

In one embodiment, the configuration is configured to represent security indication information and security result information of the PDU session.

Based on the same application concept, the embodiments of the present application further provide a method for modification in a dual-connection mode at an SN side. Since the method corresponds to the SN side device for modification in the dual-connection mode introduced in the embodiments of the present application, and a principle for solving problems of the method is similar to that of the SN side device, implementation of this method may be referred to implementation of the SN side device in the embodiments of the present application, and repetition is no longer repeated here.

Figure 10:
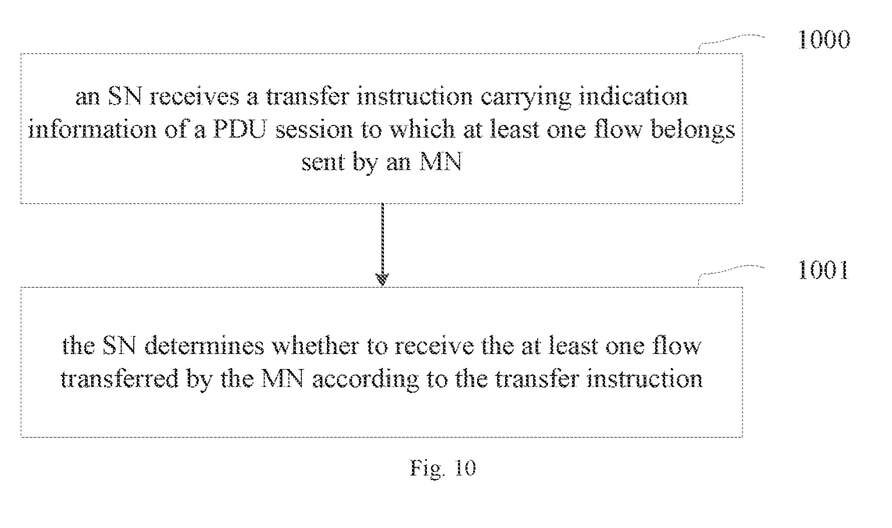
FIG. 10 is a schematic flow diagram of a second method for modification in a dual-connection mode in an embodiment of the present application.

As shown in FIG. 10, the embodiments of the present application further provide a method for modification in a dual-connection mode, and the methods includes:

step 1000, an SN receives a transfer instruction carrying indication information of a PDU session to which at least one flow belongs sent by an MN; and step 1001, the SN determines whether to receive the at least one flow transferred by the MN according to the transfer instruction.

In one embodiment, the determining, by the SN, whether to receive the at least one flow transferred by the MN according to the transfer instruction, includes:

the SN determines to receive the at least one flow transferred by the MN if the SN determines that the at least one flow includes all of flows under a PDU session according to the transfer instruction; or the SN determines whether to receive the at least one flow transferred by the MN according to configuration of the SN and configuration of the MN notified in the transfer instruction if the SN determines that the at least one flow includes part of the flows under the PDU session according to the transfer instruction.

In one embodiment, after determining, by the SN, to receive the at least one flow transferred by the MN if the SN determines that the at least one flow includes all of the flows under the PDU session according to the received transfer instruction, the method further includes:

a terminal is notified to change configuration of the PDU session to be not-performed if the SN determines that the configuration of the SN is different from the configuration of the MN notified in the transfer instruction.

In one embodiment, the determining, by the SN, whether to receive the at least one flow transferred by the MN according to the configuration of the SN and the configuration of the MN notified in the transfer instruction, includes:

the SN determines not to receive the at least one flow transferred by the MN if the SN determines that the configuration of the SN is different from the configuration of the MN notified in the transfer instruction; or the SN determines to receive the at least one flow transferred by the MN if the SN determines that the configuration of the SN is the same as the configuration of the MN notified in the transfer instruction.

In one embodiment, the configuration is configured to represent security indication information and security result information of the PDU session.

In some possible implementations, various aspects of the method for modification in the dual-connection mode provided by the embodiments of the present application can also be implemented in the form of a program product, which includes a program code. When the program code runs on a computer, the program code is used to cause the computer to perform the steps in the method for modification in the dual-connection mode according to various exemplary implementations of the present application described in this specification.

The program product may adopt any combination of one or more readable media. The readable media may be readable signal media or readable storage media. The readable storage media may be, for example, but are not limited to, an electrical, magnetic, optical, electromagnetic, infrared, or semiconductor system, apparatus, or device, or any combination of the above. More specific examples (non-exhaustive list) of the readable storage media include: electrical connection with one or more wires, a portable disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device or any suitable combination of the above.

The program product for modification in a dual-connection mode according to the implementations of the present application can adopt a portable compact disk read only memory (CD-ROM) and include program codes and can run on a server device. However, the program product of the present application is not limited to this. In this document, the readable storage media may be any tangible medium containing or storing a program, and the program may be used by or in combination with information transmission apparatuses or devices.

The readable signal media may include a data signal propagated in a baseband or as part of a carrier wave, in which a readable program code is carried. This transmitted data signal may take a variety of forms, including, but not limited to, electromagnetic signals, optical signals, or any suitable combination of the above. The readable signal media may also be any readable medium other than a readable storage medium that may send, propagate, or transmit a program for use by or in combination with a periodic network action system, apparatus, or device.

The program code contained on the readable media can be transmitted by any suitable medium, including but not limited to wireless, wired, optical cable, RF, etc., or any suitable combination of the above.

The program code for performing the operations of the present application may be written in any combination of one or more programming languages, including object-oriented programming languages such as Java, C++, etc., and conventional procedural programming languages such as "C" language or similar programming languages. The program code can be executed completely on a user computing device, partially on the user device, as a separate software package, partially on the user computing device and partially on a remote computing device, or completely on the remote computing device or server. In the case where the remote computing device is involved, the remote computing device may be connected to the user computing device through any kind of network, including a LAN (local area network) or WAN (wide area network), or may be connected to an external computing device.

The embodiments of the present application further provide a computing device readable storage medium for the method for modification in the dual-connection mode at the MN side, that is, the content will not be lost after power failure. The storage medium stores a software program, including a program code. When the program code runs on the computing device, the software program can realize the solution of any device for modification in the dual-connection mode at the MN side in the embodiments of the present application when it is read and executed by one or more processors.

The embodiments of the present application further provide a computing device readable storage medium for the method for modification in the dual-connection mode at the SN side, that is, the content will not be lost after power failure. The storage medium stores a software program, including a program code. When the program code runs on the computing device, the software program can realize the solution of any device for modification in the dual-connection mode at the SN side in the embodiments of the present application when it is read and executed by one or more processors.

In the above embodiments provided by the present application, in order to realize the functions in the method provided by the above embodiments of the present application, a data transmission device may include a hardware structure and/or a software device to realize the above functions in the form of the hardware structure, the software device, or a hardware structure plus a software device. Whether one of the above functions is performed in the form of the hardware structure, the software device or the hardware structure plus the software device depends on the specific application and design constraints of the solution.

The present application is described above with reference to block diagrams and/or flow diagrams of methods, apparatuses (systems) and/or computer program products according to the embodiments of the present application. It should be understood that a block of the block diagrams and/or flow diagrams and a combination of blocks of the block diagrams and/or the flow diagrams can be implemented by computer program instructions. These computer program instructions may be provided for a processor of a general-purpose computer and a special-purpose computer and/or other programmable data processing apparatuses to produce a machine, so that instructions executed by the processor of the computer and/or other programmable data processing apparatuses create a method for implementing a function/action specified in blocks of the block diagrams and/or flow diagrams.

Correspondingly, the present application may be further implemented through hardware and/or software (including firmware, resident software, microcodes, etc.). Further, the present application may take the form of a computer program product on a computer usable or computer readable storage medium having computer usable or computer readable program codes implemented in the medium for use by or in combination with an instruction execution system. In the context of the present application, a computer usable or computer-readable medium may be any medium that may contain, store, communicate, transmit, or convey a program for use by, or in combination with, an instruction execution system, apparatus, or device.

What is claimed is:

1. A method for modification in a dual-connection mode, comprising:
   determining, by a master node (MN), a secondary node (SN) to which at least one flow is to be transferred; and
   sending, by the MN, to the SN a transfer instruction carrying indication information of a protocol data unit (PDU) session to which the at least one flow belongs; wherein the transfer instruction is used for the SN to determine whether to receive the at least one flow transferred by the MN;
   wherein the indication information of the PDU session comprises information for indicating that the at least one flow comprises part or all of flows under the PDU session;
   wherein before sending, by the MN, to the SN the transfer instruction, the method further comprises:
   placing, by the MN, the indication information of the PDU session in a list of PDU sessions to be setup in the transfer instruction;
   wherein, the indication information of the PDU session is a split indicator newly added into PDU Session resource set up info-SN terminated IE in the list of PDU sessions to be setup, when the split indicator is set as non-SPLIT, the MN sends all of the flows under the PDU session to the SN, and when the split indicator is set as SPLIT, the MN sends part of the flows under the PDU session to the SN.

2. The method according to claim 1, wherein the determining, by the MN, an SN to which a flow is to be transferred, comprises:
   determining, by the MN, an SN needing to be added as the SN; or
   determining, by the MN, an SN needing to be modified as the SN.

3. The method according to claim 2, wherein the sending, by the MN, to the SN the transfer instruction carrying the indication information of the PDU session, comprises:
   carrying, by the MN, the transfer instruction in a node adding request sent to the SN needing to be added; or
   carrying, by the MN, the transfer instruction in a node modifying request sent to the SN needing to be modified.

4. A method for modification in a dual-connection mode, comprising:
   receiving, by a secondary node (SN), a transfer instruction carrying indication information of a protocol data unit (PDU) session to which at least one flow belongs sent by a master node (MN); and
   determining, by the SN, whether to receive the at least one flow transferred by the MN according to the transfer instruction;
   wherein the indication information of the PDU session comprises information for indicating that the at least one flow comprises part or all of flows under the PDU session;
   wherein the indication information of the PDU session is placed in a list of PDU sessions to be setup, and the indication information of the PDU session is a split indicator newly added into PDU Session resource set up info-SN terminated IE in the list of PDU sessions to be setup, when the split indicator is set as non-SPLIT, the MN sends all of the flows under the PDU session to the SN, and when the split indicator is set as SPLIT, the MN sends part of the flows under the PDU session to the SN.

5. The method according to claim 4, wherein the determining, by the SN, whether to receive the at least one flow transferred by the MN according to the transfer instruction, comprises:
   determining, by the SN, to receive the at least one flow transferred by the MN if the SN determines that the at least one flow comprises all of flows under a PDU session according to the transfer instruction; or
   determining, by the SN, whether to receive the at least one flow transferred by the MN according to configuration of the SN and configuration of the MN notified in the transfer instruction if the SN determines that the at least one flow comprises part of the flows under the PDU session according to the transfer instruction.

6. The method according to claim 5, wherein after determining, by the SN, to receive the at least one flow transferred by the MN if the SN determines that the at least one flow comprises all of the flows under the PDU session according to the transfer instruction, the method further comprises:
   notifying, by the SN, a terminal to change configuration of the PDU session to be not-performed, if the SN determines that the configuration of the SN is different from the configuration of the MN notified in the transfer instruction.

7. The method according to claim 5, wherein the determining, by the SN, whether to receive the at least one flow transferred by the MN according to the configuration of the SN and the configuration of the MN notified in the transfer instruction, comprises:
   determining, by the SN, not to receive the at least one flow transferred by the MN if the SN determines that the configuration of the SN is different from the configuration of the MN notified in the transfer instruction; or
   determining, by the SN, to receive the at least one flow transferred by the MN if the SN determines that the configuration of the SN is same as the configuration of the MN notified in the transfer instruction.

8. The method according to claim 5, wherein the configuration is configured to represent security indication information and security result information of the PDU session.

9. A device for modification in a dual-connection mode, comprising: a processor, a memory and a transceiver; wherein
   the processor is configured to read a program in the memory and execute a following process:
   determining an SN to which at least one flow is to be transferred; and sending to the SN a transfer instruction carrying indication information of a PDU session to which the at least one flow belongs; wherein the transfer instruction is used for the SN to determine whether to receive the at least one flow transferred by an MN;
   wherein the indication information of the PDU session comprises information for indicating that the at least one flow comprises part or all of flows under the PDU session;
   wherein the processor is further configured to:
   place the indication information of the PDU session in a list of PDU sessions to be setup in the transfer instruction;
   wherein, the indication information of the PDU session is a split indicator newly added into PDU Session resource set up info-SN terminated IE in the list of PDU sessions to be setup, when the split indicator is set as non-SPLIT, the MN sends all of the flows under the PDU session to the SN, and when the split indicator is set as SPLIT, the MN sends part of the flows under the PDU session to the SN.

10. The device according to claim 9, wherein the processor is further configured to:
   determine an SN needing to be added as the SN or determine an SN needing to be modified as the SN.

11. The device according to claim 10, wherein the processor is further configured to:
   carry the transfer instruction in a node adding request sent to the SN needing to be added; or
   carry the transfer instruction in a node modifying request sent to the SN needing to be modified.

12. A device for modification in a dual-connection mode, comprising: a processor, a memory and a transceiver; wherein
   the processor is configured to read a program in the memory and execute the method of claim 4.

13. The device according to claim 12, wherein the processor is further configured to:
   determine to receive the at least one flow transferred by the MN if it is determined that the at least one flow comprises all of flows under a PDU session according to the transfer instruction; or
   determine whether to receive the at least one flow transferred by the MN according to configuration of the SN and configuration of the MN notified in the transfer instruction if it is determined that the at least one flow comprises part of the flows under the PDU session according to the transfer instruction.

14. The device according to claim 13, wherein the processor is further configured to:
   notify a terminal to change configuration of the PDU session to be not-performed if it is determined that the configuration of the SN is different from the configuration of the MN notified in the transfer instruction.

15. The device according to claim 13, wherein the processor is further configured to:
   determine not to receive the at least one flow transferred by the MN if it is determined that the configuration of the SN is different from the configuration of the MN notified in the transfer instruction; or
   determine to receive the at least one flow transferred by the MN if it is determined that the configuration of the SN is same as the configuration of the MN notified in the transfer instruction.

16. The device according to claim 13, wherein the configuration is configured to represent security indication information and security result information of the PDU session.

17. A non-transitory computer storage medium, storing a computer program thereon, wherein the program, when executed by a processor, implements steps of the method according to claim 1.

18. A non-transitory computer storage medium, storing a computer program thereon, wherein the program, when executed by a processor, implements steps of the method according to claim 4.

* * * * *